(12) United States Patent
Ohr et al.

(10) Patent No.: US 9,718,093 B2
(45) Date of Patent: Aug. 1, 2017

(54) FRICTION RING AND METHOD FOR PRODUCING SAME

(71) Applicant: HOERBIGER ANTRIEBSTECHNIK HOLDING GMBH, Schongau (DE)

(72) Inventors: Andreas Ohr, Schongau (DE); Michael Bergheim, Rosshaupten (DE)

(73) Assignee: HOERBIGER ANTRIEBSTECHNIK HOLDING GMBH, Schongau (DE)

( * ) Notice: Subject to any disclaimer, the term of this patent is extended or adjusted under 35 U.S.C. 154(b) by 245 days.

(21) Appl. No.: 14/562,412

(22) Filed: Dec. 5, 2014

(65) Prior Publication Data
US 2015/0118392 A1   Apr. 30, 2015

Related U.S. Application Data

(62) Division of application No. 13/814,898, filed as application No. PCT/EP2011/003980 on Aug. 9, 2011, now abandoned.

(30) Foreign Application Priority Data

Aug. 10, 2010 (DE) .......................... 10 2010 033 876

(51) Int. Cl.
*B05D 1/36* (2006.01)
*F16D 13/60* (2006.01)
(Continued)

(52) U.S. Cl.
CPC .............. *B05D 1/36* (2013.01); *B05D 1/002* (2013.01); *B05D 3/002* (2013.01); *F16D 13/60* (2013.01);
(Continued)

(58) Field of Classification Search
CPC ..... B05D 1/002; F16D 2250/00; F16D 13/64; F16D 2300/10; F16D 23/025
See application file for complete search history.

(56) References Cited

U.S. PATENT DOCUMENTS

| 2,790,206 A | 4/1957 | Cofek |
| 3,505,446 A | 4/1970 | Griffith |

(Continued)

FOREIGN PATENT DOCUMENTS

| CN | 1931950 A | 3/2007 |
| DE | 2206400 A1 | 8/1973 |

(Continued)

OTHER PUBLICATIONS

International Search Report mailed Oct. 26, 2011 for PCT/EP2011/003980.

(Continued)

*Primary Examiner* — Xiao Zhao
(74) *Attorney, Agent, or Firm* — Hauptman Ham, LLP

(57) ABSTRACT

The invention relates to a friction ring, in particular for wet-running clutches or transmissions, having a carrier (10) and a friction lining (12) with a friction lining starting material (20) being a mixture at least of a thermosetting binder and a filler, and with the friction lining starting material (20) having a non-flowable, pasty processing consistency and the friction lining (12) having a solid final consistency after processing on the carrier (10). The invention further relates to a method producing such a friction ring.

14 Claims, 10 Drawing Sheets

(51) Int. Cl.
  *F16D 13/64* (2006.01)
  *F16D 23/02* (2006.01)
  *B05D 1/00* (2006.01)
  *B05D 3/00* (2006.01)

(52) U.S. Cl.
  CPC .......... *F16D 13/64* (2013.01); *F16D 23/025* (2013.01); *F16D 2250/00* (2013.01); *F16D 2300/10* (2013.01)

(56) References Cited

U.S. PATENT DOCUMENTS

| | | | |
|---|---|---|---|
| 4,694,937 A * | 9/1987 | Jonas | F16D 69/04 156/276 |
| 4,792,361 A | 12/1988 | Double et al. | |
| 5,196,081 A * | 3/1993 | Bicknell | F16D 13/64 156/244.11 |
| 5,433,774 A | 7/1995 | Kapl et al. | |
| 6,524,681 B1 | 2/2003 | Seitz et al. | |
| 7,488,440 B2 | 2/2009 | Fujimaki et al. | |
| 8,101,286 B2 | 1/2012 | Tung et al. | |
| 2002/0125081 A1 | 9/2002 | Meyer | |
| 2009/0321210 A1 | 12/2009 | Tung et al. | |

FOREIGN PATENT DOCUMENTS

| | | |
|---|---|---|
| DE | 2743869 A1 | 4/1978 |
| DE | 3617846 A1 | 12/1987 |
| DE | 4334207 C1 | 12/1994 |
| DE | 19650451 A1 | 6/1997 |
| DE | 20002894 U1 | 5/2000 |
| DE | 20017539 U1 | 1/2001 |
| DE | 19936805 A1 | 2/2001 |
| DE | 10257831 A1 | 7/2004 |
| DE | 10316369 A1 | 7/2004 |
| DE | 102006041001 A1 | 3/2008 |
| DE | 102008036332 A1 | 3/2009 |
| DE | 102009025540 A1 | 12/2010 |
| EP | 2034204 A2 | 3/2009 |
| FR | 1546163 A | 11/1968 |
| GB | 1415100 A | 11/1975 |
| GB | 1589392 A | 5/1981 |
| GB | 2190968 A | 12/1987 |
| JP | 1982097927 A | 6/1982 |
| JP | 1990011938 A | 1/1990 |
| JP | 1995006528 U | 1/1995 |
| JP | 1992253787 A | 7/1995 |
| JP | 2000509467 A | 10/1997 |
| JP | 2002195291 A | 7/2002 |
| JP | 2004205036 A | 12/2004 |
| JP | 2007100933 A | 4/2007 |

OTHER PUBLICATIONS

Written Opinion for ISA mailed Oct. 26, 2011 for PCT/EP2011/003980.
International Preliminary Report on Patentability mailed Feb. 21, 2013 for PCT/EP2011/003980.
German Search Report dated Sep. 19, 2011 for German Patent Application No. 10 2010 033 876.1.
Chinese Office Action dated Oct. 22, 2014.
Japanese Office Action dated Feb. 12, 2015.
Chinese Office Action dated Jun. 4, 2015.

* cited by examiner

FRICTION RING AND METHOD FOR PRODUCING SAME

The present application is a Divisional Application of U.S. Ser. No. 13/814,898 filed Mar. 11, 2013, which is a National Phase application of International application number PCT/EP2011/03980 filed on Aug. 9, 2011, which is incorporated by reference in its entirety as set forth in full.

The invention relates to a friction ring including a carrier and a friction lining, as may be used in wet-running clutches or in transmissions, for example. The invention further relates to a method of producing such a friction ring.

What is decisive for the quality of the friction ring, that is, in particular for the wear behavior and the friction coefficient over the entire service life, is the friction lining. On the one hand, basically a high friction coefficient is desired since this improves the gear-shifting behavior. On the other hand, it is demanded that wear be as low as possible, for the friction ring to have a long service life. In addition, it should be possible to produce the friction ring at low overall costs.

Friction rings are known which include a friction lining made from a papery material. Due to its production method, this material, referred to as "friction paper" below, is supplied in the form of sheets. Individual friction lining segments are then cut out of the friction paper sheets and applied onto the carrier, for example glued on. A disadvantage here is the inevitable cutting waste. In addition, the costs for producing friction paper are comparatively high.

Also known are various attempts to apply the friction lining onto the carrier in a flowable condition and to solidify it there. One example of such a method is found in DE 10 2008 036 332, in which a filling mold is placed on the carrier in order to allow the flowable friction lining composition to be applied, similar to a screen printing process. After its application the friction lining composition is dried and cured, e.g. by means of UV radiation. With regard to the friction lining composition used, only incomplete particulars are given in the above-mentioned published patent application. Aside from the problems involved in the process, no suitable material is known to date that meets the suitability requirements for the process and for the function in equal measure. For this reason, it has so far not been possible to successfully put interesting approaches of this type to practice.

The object of the invention therefore is to provide a friction ring which has a friction lining and which can be produced cost-effectively and at the same time meets or even exceeds the requirements with respect to friction coefficient behavior and wear.

This object is achieved in accordance with the invention by a friction ring including a carrier and a friction lining, a friction lining starting material being a mixture at least of a thermosetting binder and a filler, and the friction lining starting material having a non-flowable, pasty processing consistency and the friction lining having a solid final consistency after processing on the carrier.

The thermosetting binder preferably used is a phenolic resin, and the filler used is in particular an organic filler such as graphite, for example. With a suitable ratio of the components of the mixture, the friction lining starting material obtained is a mixture having a pasty processing consistency. The mixture is referred to as "pasty" in this connection when the viscosity is between about 1 Pa·s and about 100 Pa·s, preferably at 1-50 Pa·s. In this range of viscosity, the friction lining starting material can be applied onto the prepared surface without any problems, without a filling mold having to be fitted to the carrier in a liquid-tight manner for bordering the friction lining starting material on the sides. This considerably simplifies the production of the friction ring, without a noticeable impairment of the friction coefficient and the wear behavior.

In a particularly advantageous variant embodiment of the friction ring, the friction lining is produced to be substantially fiber-free. In fact, fibers, in particular fibrillated fibers as are made use of in the production of friction paper, have an adverse effect on the processability of the friction lining starting material. Furthermore, it has been found that a fiber-free friction lining can also fulfill all technical requirements, in particular with regard to friction coefficient and wear.

In an alternative variant embodiment, the friction lining includes a certain content of fibers, in particular exclusively non-fibrillated fibers.

The mass fraction of the fibers is then preferably in the range of from about 1% to about 20% of the solid fraction of the friction lining. So low, preferably single-digit, a percentage of non-fibrillated fibers still permits a pasty processing consistency and therefore a simple friction ring manufacture. Moreover, in some compositions of the friction lining starting material, this fiber content can have a positive influence on the mechanical properties of the later friction lining.

The friction lining starting material may additionally include a solvent, in particular water or ethanol, in the processing consistency. Frequently, the binder is added here already in dissolved form, for example in the form of a ready-to-use phenolic resin solution.

In a further embodiment, the friction lining starting material additionally includes a substance for adjusting a desired processing consistency. This may in particular be a thickening or thixotropic agent or an agent influencing the pseudoplasticity. The thixotropic agent facilitates the processing of the friction lining starting material since it reduces the viscosity during application, but raises the viscosity after application of the friction lining starting material.

In a further embodiment, the friction lining has interruptions and/or a flat or conical cross-sectional profile in the peripheral direction. Such interruptions, in particular in the form of grooves, allow a good oil circulation in the region of the friction lining, which allows a better dissipation of the frictional heat generated in operation of the friction ring.

In a further embodiment of the friction ring, the friction lining has a multilayer structure.

Here, the multilayer friction lining may include at least two friction lining layers having different friction lining starting materials. This allows desirable frictional properties of the friction lining to be adjusted very precisely with little effort.

According to a further embodiment of the friction ring, the friction lining contains friction particles, in particular coke particles, in the region of its friction surface. For example, the friction particles are applied onto a later friction surface of the friction lining prior to drying and curing of the friction lining starting material and penetrate at least in part into the friction lining. The friction particles may be fairly coarse here and may constitute a cover layer on the friction lining, the cover layer being even closed, if desired.

Further, the fraction of the thermosetting binder may vary over a height of the friction lining, in particular decrease from the carrier towards a friction surface.

The friction ring according to the invention is particularly suitable for use as a synchronizer ring in a transmission and for wet-running multiple disk friction systems, in particular wet-running clutches and wet-running brakes.

To achieve the object of the invention, provision is also made for a method of producing a friction ring which includes a carrier and a friction lining. In this method, first a carrier is provided. Then a surface of the carrier is prepared, namely the surface which is to be provided with the friction lining. Subsequently, a friction lining starting material is applied in a substantially dimensionally stable, pasty processing consistency onto the prepared surface without an additional mold bordering the friction lining starting material on the sides. Following this, the friction lining starting material is treated and finally cures to form the friction lining having a substantially solid final consistency. Using the method according to the invention, friction linings which distinguish themselves by a particularly good wear behavior can be produced with little effort.

In particular, the surface of the cured friction lining (friction surface) is flat.

It is particularly preferred that the pasty friction lining starting material is applied by means of at least one metering pump. Such metering pump is also referred to as a dispenser and allows an exact portioning and positioning of the friction lining starting material on the prepared surface of the carrier, involving little effort.

In a variant of the method, the friction lining starting material is applied onto the prepared surface during only one revolution of the carrier. The friction lining starting material is applied here right from the start with a cross-sectional profile that is adapted to the friction lining dimensions to be obtained later, which allows a very rapid coating of the carrier with the friction lining.

In an alternative variant of the method, the friction lining starting material is spirally applied onto the prepared surface during several revolutions of the carrier. This allows a profiling of the later friction lining to be performed as early as during application of the friction lining starting material. The profiling here consists of spiral longitudinal grooves which have a positive effect on an oil circulation in the region of the friction lining and thus allow a quick dissipation of the frictional heat produced in operation.

Following the application of the friction lining starting material onto the carrier, in a further variant of the method, friction particles, e.g. frictionally effective, coarse coke particles, are applied onto the pasty friction lining starting material. Preferably, these friction particles penetrate at least in part into the friction lining starting material during the subsequent treatment of the friction lining starting material.

The friction lining starting material may be dried, preferably immediately after being applied onto the carrier. As a result of this drying process, for example by means of hot air, infrared radiation or induction, the friction lining starting material is pre-cured, with the consistency transitioning from pasty to tough up to solid.

Following this optional drying process, the friction lining starting material may be hot-pressed. In this process, the friction lining starting material will fully cure and is finished to its exact final size.

Further features and advantages of the invention will be apparent from the description of preferred embodiments below with reference to the drawings, in which:

FIGS. 1 to 5 schematically show different steps in the production of a friction ring with a friction lining according to a first embodiment;

Figure 1:
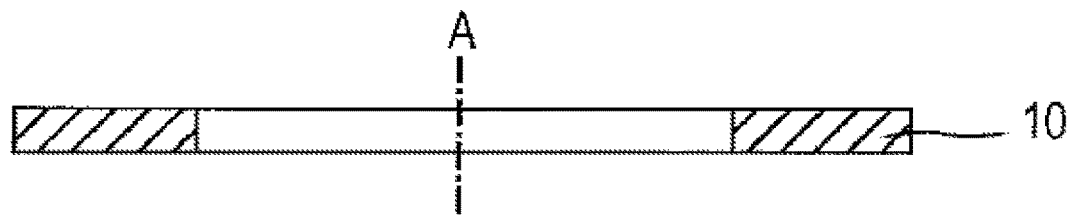
FIG. 1 shows a carrier 10 of a friction disk of a wet-running clutch, the carrier being preferably made of metal. The carrier 10 is only schematically illustrated here; any teeth provided on the inside or outside that serve for torque transmission or comparable formations (grooves, spline profile, etc.) are not depicted.
Figure 2:
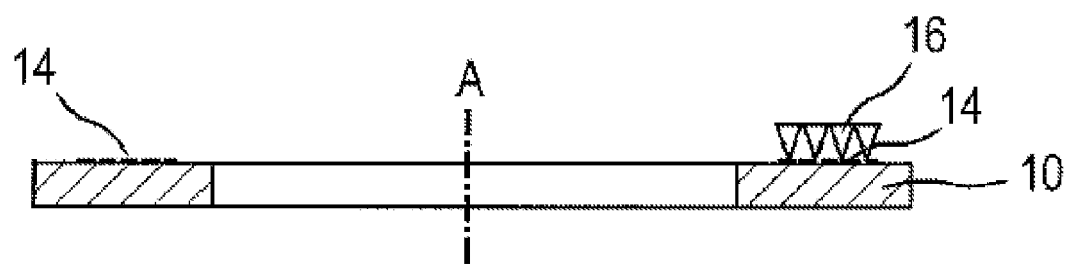

A friction lining 12 is intended to be applied onto at least one side of the carrier 10. For this purpose, a surface 14 of the carrier 10, i.e. the surface onto which the friction lining 12 is to be applied, is activated. This is illustrated by arrows 16 in FIG. 2 and enhances the connection between the friction lining 12 and the carrier 10. The activating process may be performed chemically or, from environmental aspects, preferably mechanically by sandblasting or shot peening.

Figure 3:
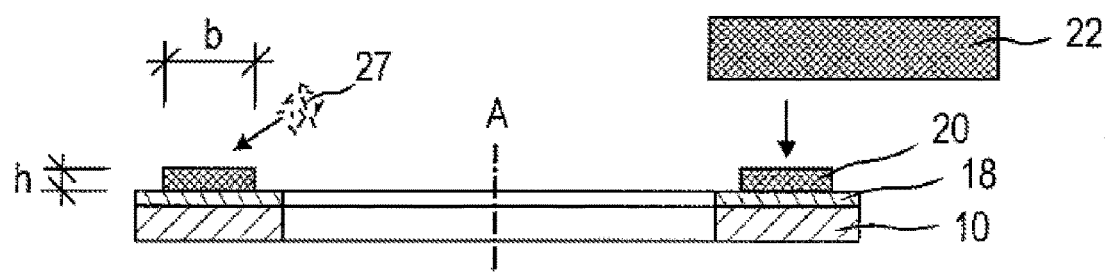

According to FIG. 3, first an intermediate adhesive layer 18 is applied onto the activated surface 14; a friction lining starting material 20 in a substantially dimensionally stable, pasty processing consistency is then in turn applied onto the intermediate adhesive layer 18. Owing to the pasty consistency (viscosity value between about 1 Pa·s and about 100 Pa·s, as determined by means of a rotational rheometer, for example), apart from the prepared surface 14 of the carrier 10, no additional mold that laterally borders the friction lining starting material 20 is necessary, as a result of which the method of producing the friction ring is considerably simplified.

When the fraction of the thermosetting binder in the friction lining starting material 20 is sufficiently high, in alternative embodiments the intermediate adhesive layer 18 may even be dispensed with since the friction lining starting material 20 will bond to the activated surface 14 during curing, without any further measures being required.

The application of the friction lining starting material 20 is effected by means of a metering pump 22, which is also referred to as a dispenser.

The friction lining starting material 20 present in the form of a mixture can be divided into exact portions by the metering pump 22 and precisely positioned on the prepared surface 14 of the carrier 10. Here the consistency of the mixture is selected such that after it is applied onto the carrier 10, the friction lining starting material 20 will maintain its cross-sectional shape (height h, width b, b') unless any extraneous influences occur. The high viscosity causes the undesirable effect that the friction lining starting material 20 "crawls" on the carrier 10, that is, that the cross-sectional height h continuously decreases while the cross-sectional width b continuously increases, to be negligible.

Figure 4:
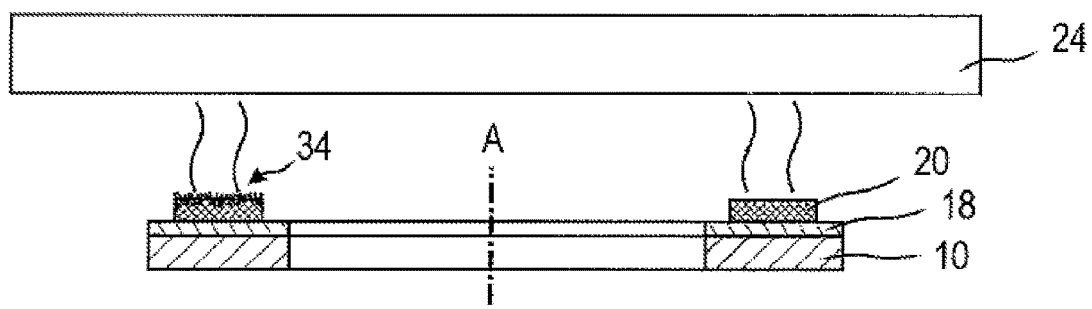

Following the application on the carrier 10, the friction lining starting material 20 is dried (see FIG. 4), for which purpose a drying device 24 may be used. Subsequently, the friction lining starting material 20 is hot-pressed, whereby it cures to form the finished friction lining 12 and is compressed to about 60% of its original height h, until eventually a desired target height of the friction lining 12 is obtained. The hot-pressing process is schematically symbolized in FIG. 5 by a calendering roller 26.

After the hot-pressing process, the carrier 10 coated with the friction lining 12 can be removed as a finished friction ring 28.

Once the friction lining starting material 20 is applied to the carrier 10, friction particles 27, e.g. coke particles, may be optionally applied onto the pasty friction lining starting material 20. Prior to treating, drying and curing the friction lining starting material 20, these frictionally active particles 27 are dispersed onto a later friction surface 32 of the friction lining 12, for example, and penetrate at least in part into the later friction lining 12, in particular during hot-pressing of the friction lining starting material 20. The friction particles 27 may be fairly coarse and may form a cover layer 34, in particular a closed cover layer 34, on the friction lining 12 (cf. FIGS. 3 and 4).

Preferably, the compressive rigidity ratio of the finished friction lining 12 is less than 40%. The compressive rigidity ratio indicates the ratio of plastic deformation to overall deformation of the friction lining 12, as can be established in a standardized compression test. Unlike friction paper, where a comparatively high plastic deformation results when it is subjected to compressive loadings, the composition of the friction lining 12 according to the invention, which is fiber-free or merely includes a low content of substantially non-fibrillated fibers, can be adjusted such that a comparatively small plastic deformation and at the same time a high elastic deformability are obtained. This is of advantage with a view to a constant friction behavior over a large number of load cycles.

Particularly preferably, the compressive rigidity ratio is less than 30%, in particular less than 20%. Adjusting the behavior of the friction lining 12 to these values upon compressive loadings will result in optimum characteristic values for the friction lining 12 when loaded.

According to a preferred embodiment of the invention, provision is made that the porosity ratio of the friction lining 12 is greater than 60 $cm^2/mm^3$. The porosity ratio specifies the ratio between the material surface and the pore volume. A high porosity ratio is advantageous with a view to the wear behavior.

Particularly preferably, the porosity ratio is greater than 70 $cm^2/mm^3$, in particular greater than 80 $cm^2/mm^3$. In this way, a particularly high stability of the friction ring 28 provided with the friction lining 12 is obtained.

According to a preferred embodiment of the invention, provision is made that the wear rate of the friction lining 12 is less than 3 $mm^3/MJ$ at an oil temperature of 60° C. The wear rate specifies the relationship between wear and frictional work performed. The friction lining 12 according to the invention allows wear rates to be attained that are considerably higher than the wear rates that can be attained with friction paper.

Particularly preferably, the wear rate is less than 2.5, in particular less than 2. Such a friction lining 12 exhibits a wear behavior that is better by a factor of 3 than with friction paper.

Figure 5:
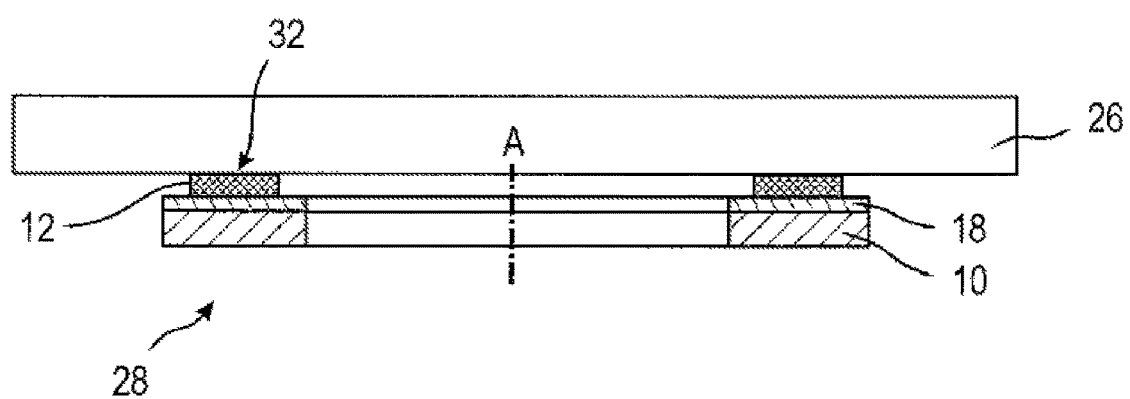

Differing from the configuration of the friction ring 28 as a flat disk as shown in FIG. 5, other geometric shapes may also be used. An exemplary embodiment of the friction ring 28 having an alternative geometric shape is illustrated in FIGS. 6 to 9. The friction ring 28 here includes a conical, i.e. frustoconical carrier 10 which is provided with the friction lining 12 on sections of its inside. Alternatively or additionally, a coating with the friction lining 12 is, of course, also conceivable on the outside of the carrier 10.

Figure 6:
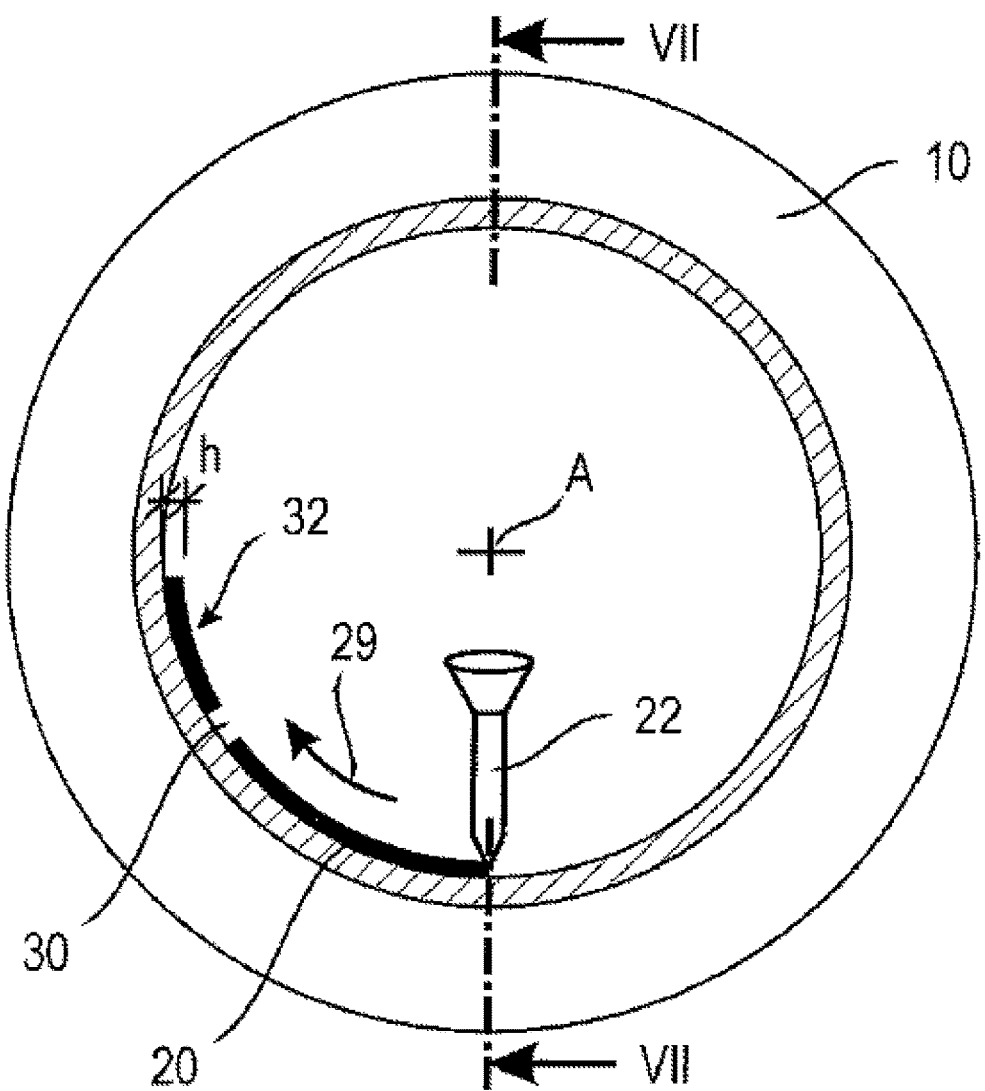
FIG. 6 shows a view of a friction ring according to a second embodiment during application of the friction lining starting material.

FIG. 6 shows an axial frontal view of the carrier 10 while the friction lining starting material 20 is applied onto the prepared surface 14 of the carrier 10 by means of the metering pump 22. The metering pump 22 is arranged to be stationary here, whereas the ring-shaped carrier 10 that is clamped in a rotating device is rotated about its axis A (cf. arrow 29). In other variants of the method, however, the ring-shaped carrier 10 is arranged to be stationary and the metering pump 22 is rotated during the application of the friction lining starting material 20.

Figure 7:
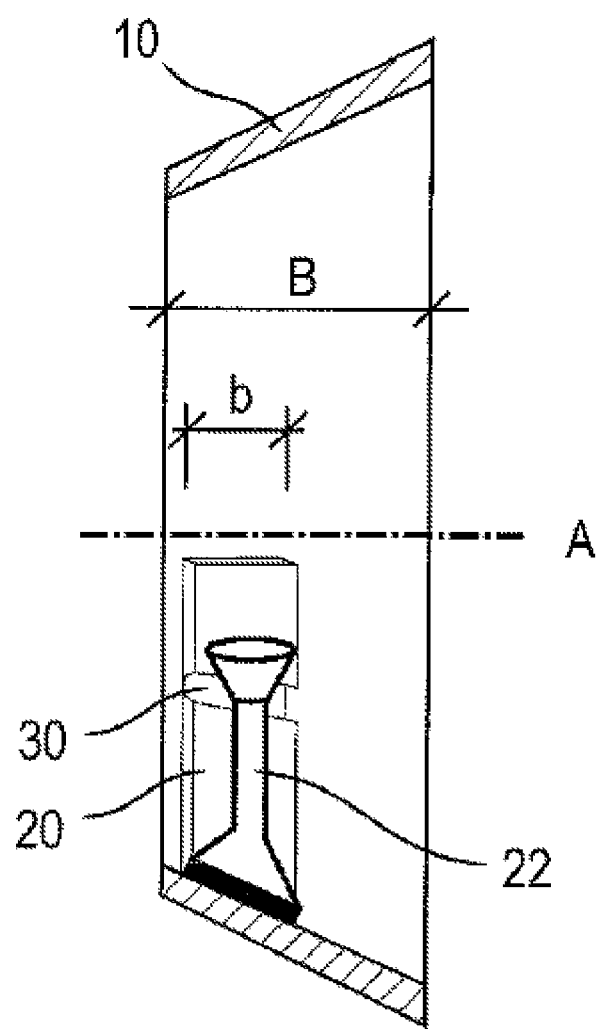
FIG. 7 shows a section taken at VII-VII through the friction ring according to FIG. 6.

FIG. 7 shows a section taken at VII-VII through the carrier 10 according to FIG. 6. It is apparent here that the metering pump 22 applies the friction lining starting material 20 onto the carrier 10 already directly with the later desired width b of the friction lining 12. In this embodiment, the entire friction lining starting material 20 for the later friction lining 12 is applied onto the prepared surface 14 during only one revolution of the carrier 10. According to FIGS. 6 to 8, the desired width b of the friction lining 12 roughly corresponds to half the width B of the carrier 10. As an alternative, the friction lining starting material 20 may in particular also be applied in a width b that roughly corresponds to the entire width B of the carrier 10.

Figure 8:
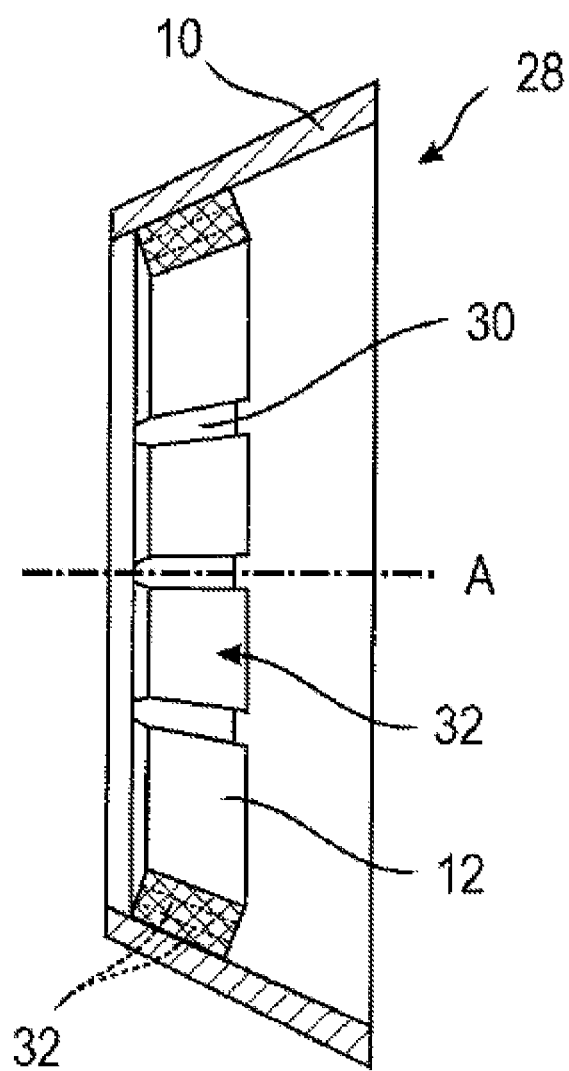
FIG. 8 shows the section taken at VII-VII through the friction ring according to FIG. 6 upon completion thereof.

FIG. 8 shows the friction ring 28 after it is completed, that is, after the curing of the friction lining starting material 20 on the carrier 10 to form the friction lining 12 having a solid consistency. It is clearly shown that the friction lining 12 has interruptions in the form of grooves 30 in the peripheral direction. Outside the grooves 30, the friction lining 12 has a flat or, alternatively, a conical cross-sectional profile.

The grooves 30 can be produced in a particularly simple fashion in that the carrier 10 clamped in the rotating device is continuously rotated about its axis A in the direction of the arrow 29 and the supply of the friction lining starting material 20 by the metering pump 22 is selectively interrupted. The grooves 30 allow good oil circulation in the region of the friction lining 12, as a result of which the frictional heat generated in operation of the friction ring 28 can be quickly dissipated. In the exemplary embodiment shown, the friction lining 12 is made up of several, i.e. at least two, separate blocks between which a respective groove 30 is provided. With this configuration, the groove 30 may be produced in an advantageous manner immediately during the production of the friction lining 12, without further processing steps being necessary after the application of the friction lining starting material 20.

In accordance with an alternative configuration, provision is made that the grooves 30 are formed as depressions in the material of the friction lining 12. This configuration is based on the fundamental concept of using a friction lining 12 that, as such, is uniform and continuous and which is provided with grooves 30 only at predetermined places. These grooves 30 may, for instance, be pressed into the friction lining 12 before the latter is fully cured. In this way, the production expenditure of the friction ring 28 is reduced, as compared to milling in the grooves 30 later.

In a further alternative configuration it is also conceivable for the friction lining 12 to have a multilayer structure. This is indicated in FIG. 8 by layer boundaries 32 drawn in in broken lines. When only one metering pump 22 is used, the friction lining starting material 20 in this case is applied, for example, over several revolutions of the carrier 10 or of the metering pump 22.

Figure 9:
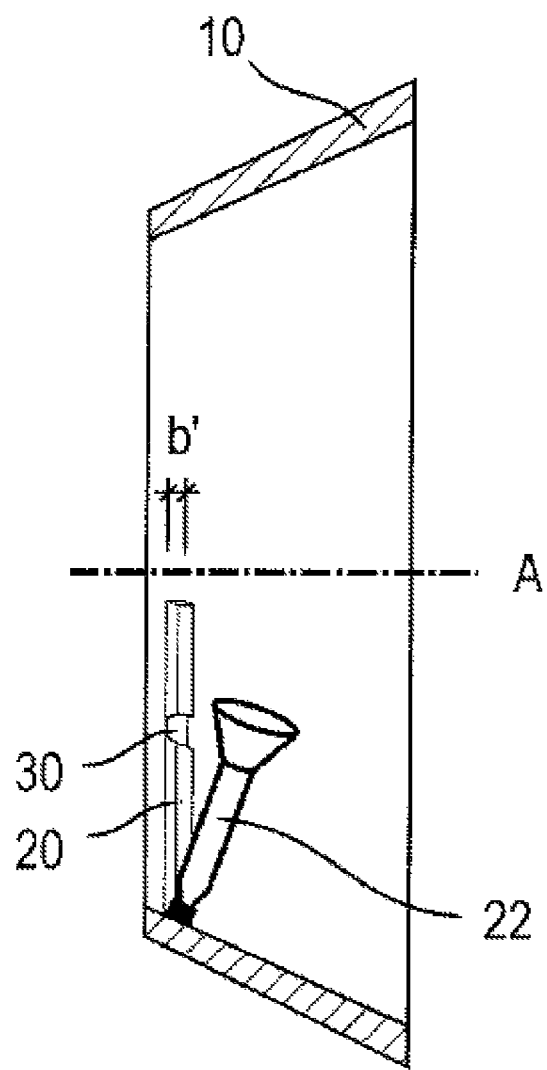
FIG. 9 shows the section taken at VII-VII through the friction ring according to FIG. 6 with the application of the friction lining starting material being varied.

In order to further enhance the oil circulation and therefore the dissipation of the frictional heat, at least one groove may also be provided in the peripheral direction. A friction lining 12 having such grooves can be produced by applying the friction lining starting material 20 as a narrow, spiral strip. A configuration of this type is indicated in FIG. 9.

Here, the friction lining starting material 20 is applied with a width b'<<b by means of the metering pump 22. In the process, the ring-shaped carrier 10 is not only rotated about its axis A in the direction of the arrow 29, but also experiences a slight but steady axial feed (to the left according to FIG. 9), so that after several revolutions of the carrier 10, the friction lining starting material 20 will extend in a spiral shape over a desired width b of the carrier 10. With a sufficient axial feed, a helical groove can be realized in this way the groove width of which is reduced as the axial feed decreases. When the axial feed is very small (smaller than b' per revolution of the carrier), embodiments with an axial overlap of the friction lining starting material 20 are also conceivable. This allows to attain directional (anisotropic) properties in the friction lining 12.

Proceeding from the grooves 30 illustrated by way of example in FIGS. 6 to 10, it is explicitly emphasized that different groove geometries or groove profiles are also conceivable. The grooves 30 may, for example, run in a curved shape, extend at an angle to the peripheral or axial direction, or be provided only in partial areas of the friction lining 12. Making use of the interaction between the rotation of the carrier 10, the interruption of the supply of the friction lining starting material 20 by means of the metering pump 22, and the axial feed, if required, groove shapes of such type can also be produced with little effort.

Furthermore, the friction lining 12 may be given a multilayer structure by passing through the application process several times, in particular when different friction lining starting materials 20, 20' are used. As an alternative, a desired layering may be obtained by simultaneously utilizing a plurality of metering pumps 22 when the friction lining starting material 20 or the friction lining starting materials 20, 20' are applied.

Figure 10:
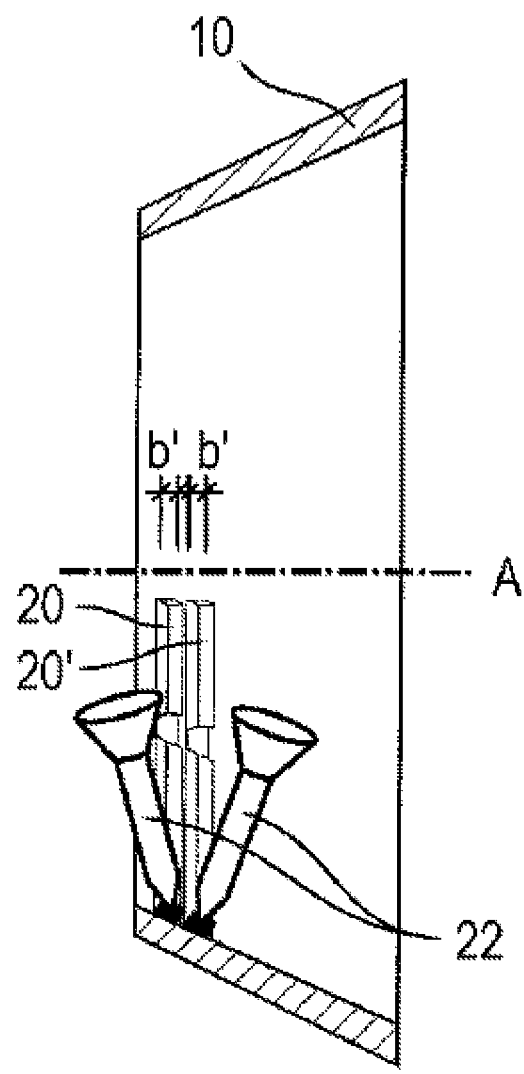
FIG. 10 shows the section taken at VII-VII through the friction ring according to FIG. 6 with the application of the friction lining starting material being further varied.

As an example, FIG. 10 shows a variant for applying the friction lining starting material 20 onto the carrier 10 by means of two metering pumps 22. These metering pumps 22 may apply different friction lining starting materials 20, 20', so that a multilayer friction lining 12 with different layer properties is obtained. An arrangement of metering pumps 22 with an axial offset (FIG. 10) results in a layering in the axial direction; with a suitable rotation and a corresponding axial feed of the carrier 10, the different friction lining starting materials 20, 20' will alternate in the axial direction. An arrangement of metering pumps 22 offset in the peripheral direction, on the other hand, will result in a layering in the radial direction, as is indicated in FIG. 8 by the layer boundaries 32.

In a special variant embodiment, a different friction lining starting material 20, 20' is used for each friction lining layer of the multilayer friction lining 12.

An essential feature of the friction rings 28 described is the composition of the friction lining 12. The friction lining starting material 20, 20' of the friction lining 12 is a mixture at least of a thermosetting binder and an organic filler, the mixture having a non-flowable, pasty processing consistency and the friction lining 12 having a solid final consistency.

A resin, in particular a powdery resol phenolic resin, may be used for the thermosetting binder. The mass fraction of the resin is variable in a wide range. The lower limit for the fraction of the resin in the solid fraction of the friction lining 12 results from the requirement that sufficient resin must be available for binding the filler and the fibers provided, if required, to form a durable friction lining 12. The upper limit of the fraction of the resin in the solid fraction results from the requirement that the friction lining 12 must contain a certain fraction of fillers for its strength and wear resistance. Preferred values for the fraction of the resin in the solid fraction are, for example, 15% to 50%, preferably about 35%.

In order to further enhance the properties of the friction lining 12, in some embodiments of the friction ring 28 the content of the thermosetting binder may vary over the height h of the friction lining 12, in particular may decrease from the carrier 10 towards the friction surface 32. This is feasible with little effort specially with multilayer friction linings 12 as are indicated in FIG. 8.

According to a preferred embodiment, provision is made that the friction lining 12 contains a heat-resistant filler. The heat-resistant filler improves the frictional properties and the wear behavior. The term "filler" is used here as a generic term both for a single-material filler and for a mixture of different materials which together constitute the filler.

The mass fraction of the filler may amount to a maximum of 85% of the solid fraction. A mass fraction of the filler in the range of from 60% to 70%, in particular of about 65%, of the solid fraction has turned out to be particularly advantageous. These values have been found to be a good tradeoff between the costs and the performance behavior of the friction lining 12.

Graphite is particularly suitable for use as a filler since its properties will not change at the temperatures involved. But alternatively, coke, friction dust or the like may also be used as a filler.

To obtain a desired viscosity of the friction lining starting material 20, 20' and to facilitate the processing thereof, in a preferred embodiment the friction lining 12 is made to be substantially fiber-free. It has, in fact, been found that the friction lining 12 satisfies the requirements with regard to friction coefficient and wear even without containing fibers.

In an alternative embodiment of the friction ring, the friction lining 12 includes a small fiber content, the mass fraction of the fibers being in the range of from 1% to 20%, preferably amounting to about 5%, of the solid fraction of the friction lining 12. The fibers are mainly, preferably exclusively, non-fibrillated fibers, so that a desired consistency can be adjusted and a simple processability is provided. Depending on the particular composition of the friction lining starting material 20, 20', this rather low fiber content can also contribute to an improvement in the mechanical properties of the friction lining 12.

The fibers employed may basically be any type of fiber having the required temperature resistance, in particular a melting or decomposition temperature of higher than 400° C. Especially suitable are carbon fibers, glass fibers, phenolic resin fibers, polyacrylonitrile fibers and/or melamine fibers. A special feature of these fibers resides in that they have a comparatively small length; in particular, they are not longer than 1 mm. Particularly preferably, the length of the fibers amounts to a maximum of 0.3 mm and less.

The friction lining starting material 20, 20' may include a solvent such as, e.g., water, methanol or ethanol in the processing consistency. Especially preferably, water is added since the use thereof is of advantage both from cost aspects and from environmental aspects. Instead of the separate addition of solvent, it is also possible to add the binder already in dissolved form, for example in the form of a phenolic resin solution.

In order to adjust a desired processing consistency, a thickening or thixotropic agent may optionally be added to the friction lining starting material 20, 20'. The thixotropic agent facilitates the processing of the friction lining starting material 20, 20' since it reduces the viscosity during the application, but raises the viscosity after the application of the friction lining starting material 20, 20'.

Preferably, thixotropic agents from the group of the sheet silicates are made use of because these will not affect the friction and wear behavior even at high operating temperatures.

In addition, thixotropic agents from the group of the smectites have turned out to be particularly suitable for use in friction linings.

Particularly preferably, the thixotropic agent contains lithium ions. This, too, is of advantage with a view to its use in a friction ring 28 which is exposed to permanently high wear loads at high temperatures.

The friction ring 28 described above is particularly suitable for use as a synchronizer ring in a vehicle transmission and also for wet-running multiple disk friction systems of vehicles, in particular wet-running clutches or brakes.

The invention claimed is:

1. A method of producing a friction ring which includes a carrier and a friction lining, the method comprising:
   providing a carrier;
   preparing a surface of the carrier, which surface is to be provided with the friction lining;
   applying a pasty friction lining starting material in a substantially dimensionally stable, pasty processing consistency onto the prepared surface without an additional mold bordering the pasty friction lining starting material on sides of the pasty friction lining starting material;
   treating the pasty friction lining starting material, which finally cures to form the friction lining having a substantially solid final consistency and positioned as the uppermost layer of the friction ring.

2. The method according to claim 1, wherein the applying comprises applying the pasty friction lining starting material by means of at least one metering pump.

3. The method according to claim 1, wherein the applying comprises applying the friction lining starting material onto the prepared surface during one revolution of the carrier.

4. The method according to claim 1, wherein the applying comprises applying the friction lining starting material onto the prepared surface during several revolutions of the carrier.

5. The method according to claim 1, further comprising, after the applying, applying friction particles onto the pasty friction lining starting material.

6. The method according to claim 5, wherein the treating comprises penetrating the friction particles at least in part into the friction lining starting material.

7. The method according to claim 1, wherein the treating comprises drying the friction lining starting material.

8. The method according to claim 1, wherein the treating comprises hot-pressing the friction lining starting material.

9. The method according to claim 1, wherein the pasty friction lining starting material has viscosity is between 1 Pas and 100 Pas.

10. The method according to claim 1, wherein the pasty friction lining starting material has viscosity is between 1 Pas and 50 Pas.

11. The method according to claim 1, wherein the pasty friction lining starting material comprises thixotropic agents selected from the group of sheet silicates.

12. The method according to claim 1, wherein the pasty friction lining starting material comprises thixotropic agents selected from the group of smectites.

13. The method according to claim 1, wherein the pasty friction lining starting material comprises thixotropic agents comprising lithium ions.

14. The method according to claim 1, wherein the preparing the surface comprises preparing an intermediate adhesive layer onto the surface, and
   wherein the applying the pasty friction lining starting material comprises applying the pasty friction lining starting material onto the intermediate adhesive layer.

* * * * *